INVENTOR.
HARRISON W. MORRIS

Nov. 15, 1966 H. W. MORRIS 3,285,005

TURBINE ENGINE CONSTRUCTION

Filed May 28, 1964 2 Sheets-Sheet 2

INVENTOR.
HARRISON W. MORRIS

BY Hauke & Hauke

ATTORNEYS

United States Patent Office 3,285,005
Patented Nov. 15, 1966

3,285,005
TURBINE ENGINE CONSTRUCTION
Harrison William Morris, Detroit, Mich., assignor to Continental Aviation and Engineering Corporation, Detroit, Mich., a corporation of Virginia
Filed May 28, 1964, Ser. No. 370,796
3 Claims. (Cl. 60—39.32)

The present invention relates to a turbine engine and more particularly to an improved means for separating one area of such engines from another when the areas to be separated are subjected to diverse pressures and temperatures.

As hot gases and air are conducted from one stage of a turbine engine or the like to another stage areas are often encountered where the conducting means are subjected to wide variations in temperatures and pressures. Thermal expansion and contractions and forces produced by pressure differentials produce severe loading which must be compensated for in the construction of such engines. The present invention provides an improved thermal-pressure differential compensating means for turbine engines and the like.

It is an object then of the present invention to improve the construction of turbine engines and the like by providing an improved thermal pressure differential compensating area separating means for such engines.

It is another object of the present invention to provide an improved means of producing a radial separation of areas of a turbine engine or the like where the areas to be separated are subjected to widely diverse temperatures and pressures by providing a substantially conically shaped and separating member having peripheral edges secured to portions of the engine and a substantially U-shaped thermal compensating portion provided adjacent one of the peripheral edges.

Still further objects and advantages will readily occur to one skilled in the art to which the present invention pertains upon reference to the following drawings in which.

*Description*

Figure 1:
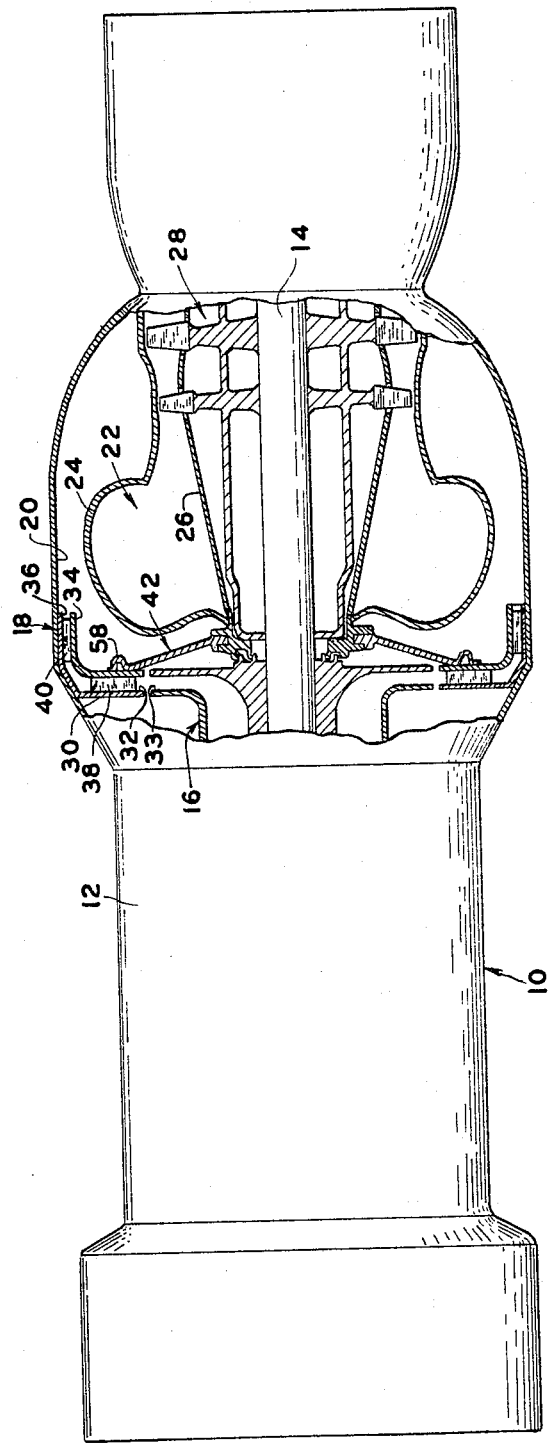
FIG. 1 is a side view of a preferred internal combustion turbine engine with various parts broken away and others shown in cross-section for purposes of clarity.

Now referring to the drawings for a more detailed description of the present invention, a preferred gas turbine engine 10 is illustrated as comprising a conventional engine housing 12 rotatably supporting a drive shaft 14. A compressor 16 is mounted on the shaft 14 to be rotatable therewith and is operable to deliver compressed air through a diffuser structure 18 axially into a compressed air reservoir 20.

The engine 10 further comprises an annular and toroidal shaped combustion chamber 22 defined by an inner combustor housing 24 and an outer combustor housing 26. A turbine assembly generally indicated at 28 is drivingly connected to the shaft 14.

Figure 2:
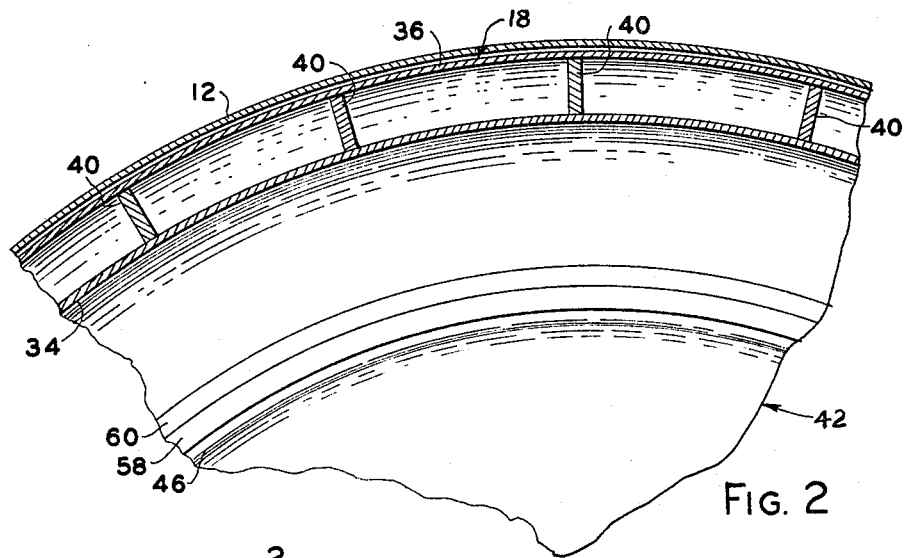
FIG. 2 is a lateral cross-sectional view taken substantially at line 2—2 of FIG. 3.
Figure 3:
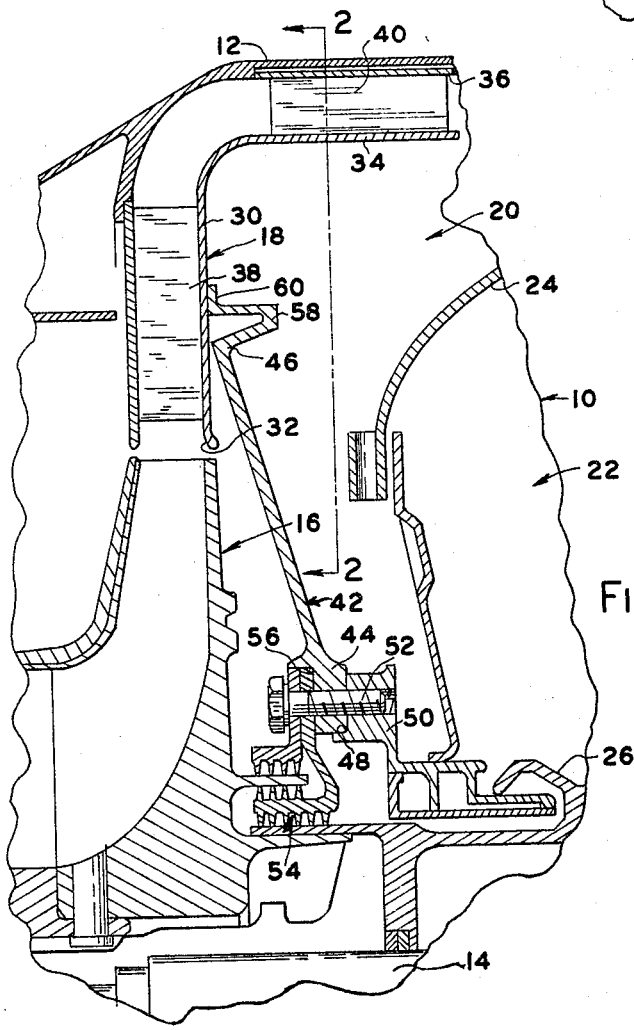
FIG. 3 is an enlarged fragmentary longitudinal cross-sectional view of the preferred thermal-pressure differential compensating separating member in the engine of FIG. 1.

As can best be seen in FIGS. 2 and 3, the diffuser structure 18 is secured to the engine housing 12 and comprises an annular hollow radially extending housing portion 30 provided with an annular inlet opening 32 to receive compressed air from an outlet 33 of the compressor 16 and an annular axially extending hollow portion 34 provided with an annular outlet 36 opening to the compressed air reservoir 20. A plurality of annularly spaced radially extending vanes 38 are provided in the portion 30 and a plurality of annularly spaced radially extending vanes 40 are provided in the portion 34.

It is understood that during the operation of the engine 10 the compressor 16 is being rotated with the shaft 14 which is in turn being driven by the turbine assembly 28. Since the diffuser structure 18 is fixed to the engine housing 12 and does not rotate, it is impossible to produce a fluid-tight connection between the diffuser structure inlet 32 and the compressor outlet 33. The problem of providing such a connection is made more difficult by the wide variances in temperatures and pressures occurring across that portion of the diffuser structure 18 which is adjacent the compressed air reservoir 20. The interior of the diffuser structure 18 is subjected to the relatively low temperatures and low pressures of the inlet air while the outer portion of the diffuser structure 18 is exposed to the compressed air reservoir 20 and to the intense heat produced by the combustion chamber 22. If intense heat produced air is permitted to enter the compressed air reservoir 20 through the open connection between the compressor outlet 33 and the diffuser inlet 32, not only will a substantial loss in pressure result due to the air bypassing the vanes 38 and 40 but also the desired flow patterns and characteristics of the air in the reservoir 20 and the combustion chamber 22 will have been upset. It is therefore desirable to provide an effective means of sealing the diffuser inlet 32 and the compressor outlet 33 from the compressed air reservoir 20.

To produce this result the present invention provides a separating means in the form of a diaphragm structure 42. As illustrated in FIGS. 2 and 3, the diaphragm structure 42 is substantially conical in form and comprises an inner annular edge portion 44 and an outer annular edge portion 46. The inner annular edge portion 44 is adapted to seat in an annular recess 48 provided in a mounting structure 50 and to be secured thereto by a plurality of annularly spaced bolts 52. The mounting structure 50 is in turn secured to the inner combustor housing 26 and the outer combustor housing 24. An annular labyrinth seal means 54 is carried in a recess 56 provided in the edge portion 44 of the diaphragm structure 42 and is secured thereto by the bolts 52. The outer annular edge portion 46 of the diaphragm structure 42 is provided with a portion 58 which is substantially U-shaped in a lateral cross-section as shown. A substantially radially extending foot portion 60 of the diaphragm structure 42 is secured to the inner wall of the diffuser structure 18 in a position substantially medially of the ends of the vanes 38.

The diaphragm structure 42 provides an effective thermal and pressure compensating separating means between the relatively cool and low pressure air escaping from the compressor outlet 33 and the relatively hot and high pressure air in compressed air reservoir 20. The expansions and contractions produced in the diaphragm structure 42 by these thermal and pressure differentials are transmitted substantially radially through the structure 42 and are taken up by the U-shaped portion 58 adjacent the outer annular edge 46. This substantially eliminates the effect of such forces as tending to disconnect the secured inner edge portion 44 and outer edge portion 46 of the structure 42. Any axial force exerted on the diffuser structure 18 by the diaphragm structure which may be caused either by pressure differential or thermal differential will be relatively slight and will be directed through the outer edge portion 46 to an area of the diffuser structure 18 substantially midway between the ends of the vanes 38. The vanes 38 are relatively thin and inherently fragile with a tendency to collapse under severe loading. By minimizing the load directed to these vanes and by directing that load substantially midway between them, the danger of such collapse is substantially eliminated.

It is apparent that although I have described but a snigle embodiment of the present invention, many changes and modifications can be made without departing from the spirit of the invention as expressed by the appended claims.

I claim:

1. In combination with a turbine engine having a drive shaft, a combustion chamber disposed about said drive shaft, a compressed air reservoir disposed adjacent said combustion chamber, a compressor driven by said shaft and having a rotating annular outlet and delivering compressed air substantially radially inwardly through said outlet, a fixed diffuser structure having an inlet to receive the compressed air from said compressor outlet and delivering it annularly in an axial direction into said compressed air reservoir, means for sealing said compressed air reservoir from said compressor outlet and said diffuser inlet comprising a separating member being substantially conical in shape, said separating member having an inner peripheral edge, means securing said inner peripheral edge of said separating member about said shaft in sealing relation thereto, said separating member further comprising a medial portion extending conically from said inner peripheral edge to an area adjacent said diffuser structure, a thermal and pressure compensating portion provided at the outer edge of said medial portion and comprising an annular bent portion being substantially U-shaped in cross-section in planes containing the axis of said shaft, said U-shaped portion forming a relatively small portion of said separating member in relation to said medial portion, said separating member further comprising a radially extending outer edge portion fixed to a radially extending surface of said diffuser structure intermediate said inlet and said diffuser structure outlet whereby said separating member separates and seals said compressed air reservoir from said compressor outlet and forces caused by pressure and thermal differentials existing in said compressed air reservoir and at said compressor outlet and acting upon said separating member are taken up by said U-shaped portion.

2. The combination as defined in claim 1 and in which
(a) said diffuser structure comprises a radially extending annular hollow portion communicating with said inlet,
(b) a plurality of annularly spaced radially extending vanes being provided in said hollow portion,
(c) said edge portion of said separating member being secured to said diffuser structure substantially midway between the ends of said vanes.

3. In a turbine engine having a combustion chamber, a compressed air reservoir adjacent said combustion chamber, a rotating compressor outlet, a fixed diffuser structure having an inlet positioned to receive compressed air emitted from said compressor outlet, said diffuser structure comprising a radially extending annular hollow portion communicating with said inlet, a plurality of annularly spaced radially extending vanes being provided in said hollow portion and an outlet connecting said hollow portion with said compressed air reservoir, a means for sealing said compressed air reservoir from said compressor outlet and said diffuser structure inlet, said means comprising, (a) a diaphragm structure having a medial portion being substantially conical in shape, an outer substantially radially extending edge portion having a radially extending surface fixed to a radially extending surface of said hollow portion of said diffuser structure substantially midway between the ends of said vanes, and an inner peripheral edge adapted to be fixed to said engine to position said medial portion to prevent compressed air from entering said compressed air chamber directly from said compressor outlet, and (b) said diaphragm structure further comprising an annular portion substantially U-shaped in cross sections in planes containing the axis of said conical medial portion, said U-shaped portion being a relatively small portion of said diaphragm in comparison with said medial portion and being disposed intermediate said medial portion and said radially extending outer edge portion.

References Cited by the Examiner

UNITED STATES PATENTS 2,445,661   7/1948   Constant et al. _____ 60—39.32
2,856,755  10/1958   Szydlowski _____ 60—39.32 X MARK NEWMAN, *Primary Examiner.*

RALPH D. BLAKESLEE, *Examiner.*